(No Model.)
C. E. O'KEENAN.
GALVANIC BATTERY.
No. 380,589. Patented Apr. 3, 1888.
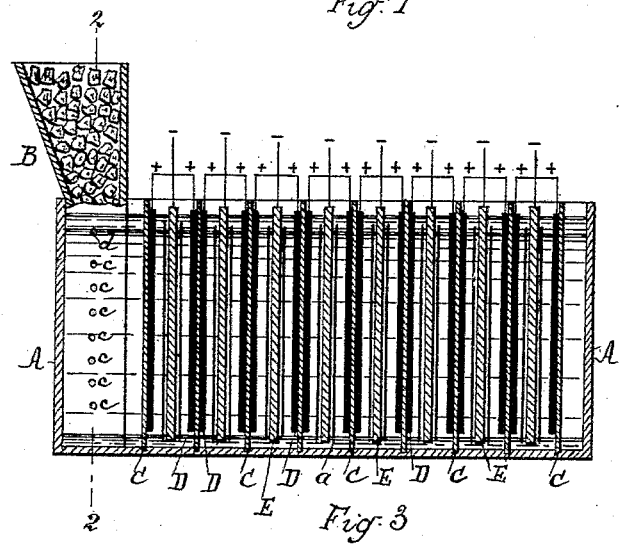
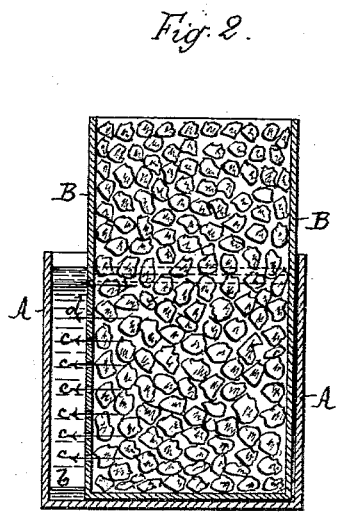
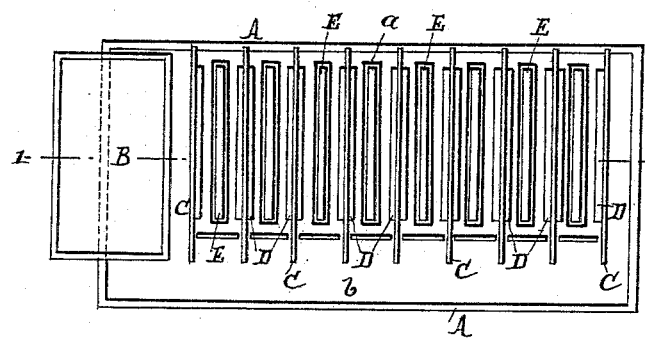
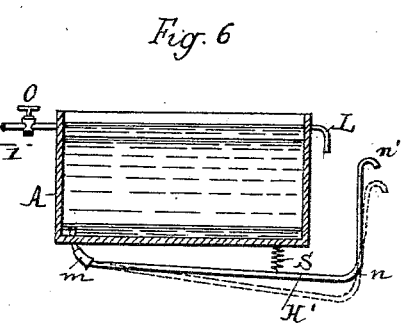
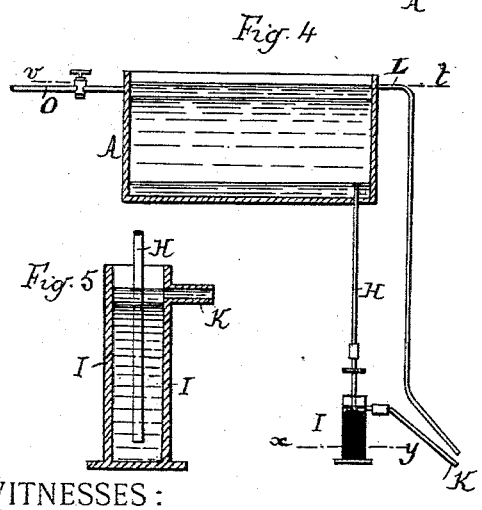
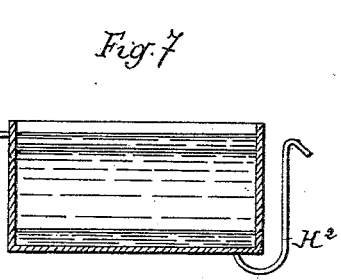
WITNESSES:
M. S. Powers.
Wm. H. Hannam.
INVENTOR:
Charles Edward O'Keenan,
By his Attorneys,
Arthur E. Draper & Co.

UNITED STATES PATENT OFFICE.

CHARLES EDWARD O'KEENAN, OF ST. CLOUD, NEAR PARIS, FRANCE.

GALVANIC BATTERY.

SPECIFICATION forming part of Letters Patent No. 380,589, dated April 3, 1888.

Application filed June 2, 1887. Serial No. 240,092. (No model.)

*To all whom it may concern:*

Be it known that I, CHARLES EDWARD O'KEENAN, a subject of the Queen of England, residing in St. Cloud, near Paris, France, have invented certain new and useful Improvements in Primary Galvanic Batteries, of which the following is a specification.

In my Patent No. 354,434, dated December 14, 1886, I have described certain constructions of primary galvanic batteries the liquids of which are automatically renewed. According to the invention claimed in that patent, a quantity of "desaturating-liquid" (generally water) is injected into the battery cup or cell whenever the solution therein exceeds a predetermined density, and simultaneously a corresponding quantity of the dense solution is discharged or caused to flow out from the cell.

My present invention has reference to modifications of and improvements in the construction of battery embodied in said patent, and relates particularly to batteries of the Daniel type.

My improvements relate, on the one hand, to a new and simplified method of maintaining a constant depth of liquid and constant saturation of the solution of sulphate of copper or other exciting-liquid, and, on the other hand, to means for automatically discharging the sulphate-of-zinc solution generated by the action of the battery.

My present improvements are illustrated in the accompanying drawings, wherein—

Figure 1 is a longitudinal mid-section of the battery in the plane of the line 1 1 in Fig. 3. Fig. 2 is a transverse section thereof in the plane of the line 2 2 in Fig. 1. Fig. 3 is a plan thereof. Fig. 4 is a vertical section of the battery-cup, showing in elevation the means for automatically discharging the spent sulphate-of-zinc solution. Fig. 5 is a vertical section, on a larger scale, of the vessel I in Fig. 4. Fig. 6 is a section of the battery-cup, showing a modified method of discharging the sulphate of zinc; and Fig. 7 is a similar section to Fig. 6, illustrating a further modification.

Let A designate the battery cup or receptacle containing the elements of the battery, and B a receptacle or chamber which is placed or arranged in one end thereof. This chamber B is filled with crystals of sulphate of copper, and has communication with the liquid of the battery through the medium of a vertical series of holes, $c\ c$, which are formed in one of its sides in communication with the distributing gutter or channel $b$ of the battery. The chamber B has a closed bottom and sides, and is preferably constructed as a box or receptacle removable from the cup A. It is also preferably made to extend much higher than the cup, so that it may be filled with a supply of crystals to above the level of the battery-solution. The holes $c\ c$ are arranged at intervals one above another, the lowest being some distance above the bottom of the receptacle, and the highest, lettered $d$, (which I will call the "depth-hole,") being some two or three centimeters below the top of the receptacle A.

Fig. 2 illustrates the circulation of the liquids. The cup A being filled with liquid to above the level of the depth-hole $d$, the liquid enters the receptacle B through that hole and comes in contact with the crystals of sulphate of copper, which it dissolves, and, becoming more dense, descends within the receptacle B and passes out through the several holes $c\ c$ into the distributing-channel $b$, whence it passes to the elements of the battery. The circulation thus established continues until the solution of sulphate of copper becomes saturated and diffuses itself between the level of the hole $d$ and that of the lowest hole, $c$, without encroaching on the bed of water at the top of the vessel or the layer of nearly-saturated sulphate of zinc at the bottom. The solution of sulphate of copper which is most nearly saturated passes out of the receptacle B into the distributing-channel $b$ and to the elements by the lower holes, $c\ c$, and the portion which is the least saturated and the pure water pass from the distributing-channel and the elements into the receptacle B through the upper holes, so that a continual circulation is maintained. The copper solution cannot rise above the depth-hole $d$, so that if the cup be filled above this level there will always be a bed of fresh desaturating solution above the exciting solution.

The elements of my battery consist of plates of glass or paraffined wood, C C, carrying on each side a sheet of lead, D, and of zinc plates E E, arranged between the partitions, and each of which is inclosed in a case or bag of parchment paper *a*.

The improved method of maintaining the copper solution at a uniform saturation which is provided by my present invention avoids the complication and trouble incident to the use of an elevated hermetically-closed reservoir containing crystals of sulphate of copper, as heretofore, and accomplishes the same result by the simplest and most effective means. At the same time it is free from the disadvantages inherent in the use of a cage of crystals of sulphate of copper suspended in the solution, as in one form of Daniel's battery. The small holes in my receptacle B restrict the flow and keep the saturation more constant from time to time than when an open cage is used, and with my construction there is always a layer of pure liquid above the upper hole.

The improved means provided by my invention for discharging the saturated sulphate-of-zinc solution from the battery is illustrated in Figs. 4 and 5. In Fig. 4 the elements are removed from the battery cup or vessel A, showing clearly the three superposed liquids—namely, water, sulphate of copper, and sulphate of zinc. A tube, H, extends from the level of the sulphate-of-zinc solution downwardly and enters a cup, I, containing mercury, in which its end is sealed to a sufficient depth to displace a column of mercury of sufficient height to counterpoise the column of liquid between the upper level, $v\,t$, and the lower level, $x\,y$.

The upper level, $v\,t$, being maintained at a predetermined height by any suitable means, the automatic apparatus acts as follows: As soon as the battery is put in operation the layer of sulphate-of-zinc solution, which is found at the bottom and the density of which is greater than that of the sulphate of copper, increases in volume until it rises above the upper end of the tube H, into which it descends and from which it drives out or siphons out the sulphate of copper with which this tube has previously been filled. The mercury, which until this time has sufficed to counterpoise and uphold the column of sulphate-of-copper solution, has not sufficient height to continue to uphold the column, since it is rendered more dense by the replacing of the sulphate of copper with sulphate of zinc. The equilibrium is consequently broken and the solution of sulphate of zinc descends and escapes through the mercury, and this action subsequently continues in greater or less quantity, according to the force of the current produced by the battery. The sulphate of zinc which escapes through the mercury rises to the surface of the cup I, and is discharged to the sewer through a tube, K.

In Fig. 4, O is a pipe through which water is supplied to the top of the vessel A, and L is an overflow-pipe designed to discharge any excess of water in case the predetermined level should be exceeded.

Fig. 6 represents another simple arrangement of differential tube which requires but little vertical space. H' designates a tube, of which the end *m* is connected to the bottom of the vessel A through the medium of a flexible tube of rubber or otherwise, and which descends thence by a slight incline to a bend, *n*, whence it ascends and terminates in a neck or spout, *n'*. The sulphate of zinc occupying the bottom of the battery descends into the tube H' and flows toward the lower portion, *n*, thereof, thereby increasing the weight of the column of liquid within the tube H', which causes a change in the position of the latter, in the manner indicated in dotted lines. The spout *n'* is thus lowered, resulting in a discharge of the solution. If the density of the column in the tube H' diminishes, the tube is drawn back to its first position under the action of a spring, S, or a counter-weight.

Fig. 7 shows an arrangement which requires that the depth of water in the battery shall be maintained constant by means of a Mariotte flask, M, or by some other analogous means. The discharge-tube H² is fixed in position, and its contained column of liquid is in perfect equilibrium with the two other liquids of the battery; but as soon as the battery has acted the layer of sulphate of zinc is augmented in height and exercises a greater pressure on the lower part of the tube H², and thereupon runs out through the tube, and it will continue thus to pass out as long as the battery continues to act.

In Figs. 6 and 7, as well as in Fig. 4, O designates the tube through which fresh water is supplied to the battery.

I claim as my invention—

1. The combination, with a galvanic battery, of a chamber or receptacle for containing crystals of the salt used for its exciting solution, and communicating with it through the medium of a depth-hole near the top of the battery and one or more other holes at lower levels, whereby the liquid from the battery enters said receptacle through said depth-hole, dissolves the crystals, and passes back to the battery through a hole at a lower level, thereby maintaining the solution at an approximately constant saturation and on a level with said depth-hole, and means for automatically supplying the battery with desaturating-liquid above the level of said depth-hole.

2. The combination, with a galvanic battery, of a receptacle for containing crystals of the salt used for its exciting solution, and communicating with it through the medium of holes at different levels, of which the upper hole is below the level of the liquids in the battery and the lower hole is above the bottom of the battery, means for automatically supplying the battery with desaturating-liquid to a level above said upper hole, and means for automatically discharging from the battery the spent liquid, and thereby keeping the level thereof below said lower hole.

3. The combination, with a galvanic battery, of an outflow-tube leading from the lower portion thereof and extending downward, and a cup containing a dense liquid, in which the bottom end of said tube is sealed, substantially as set forth.

4. The combination, with a galvanic battery, of an outflow-tube leading from a lower portion thereof and extending downward, a mercury-cup in which the bottom end of said tube is sealed, and a discharge-tube leading from said cup above the level of the mercury therein, substantially as set forth.

In witness whereof I have hereunto signed my name in the presence of two subscribing witnesses.

CHARLES EDWARD O'KEENAN.

Witnesses:
  ROBT. M. HOOPER,
  AMAND RITTER.